(12) United States Patent
Gieras et al.

(10) Patent No.: US 10,270,305 B2
(45) Date of Patent: Apr. 23, 2019

(54) MOTOR-GENERATOR WITH MULTIPLE STATOR WINDINGS

(71) Applicant: Hamilton Sundstrand Corporation, Charlotte, NC (US)

(72) Inventors: Jacek F. Gieras, Glastonbury, CT (US); Gregory I. Rozman, Rockford, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 504 days.

(21) Appl. No.: 14/961,194

(22) Filed: Dec. 7, 2015

(65) Prior Publication Data
US 2017/0163114 A1 Jun. 8, 2017

(51) Int. Cl.
| | | |
|---|---|---|
| H02K 7/02 | (2006.01) |
| H02K 3/28 | (2006.01) |
| H02K 47/20 | (2006.01) |
| B60K 6/00 | (2006.01) |
| H02K 21/24 | (2006.01) |
| H02K 16/00 | (2006.01) |

(52) U.S. Cl.
CPC .......... *H02K 3/28* (2013.01); *B60K 6/00* (2013.01); *H02K 7/025* (2013.01); *H02K 16/00* (2013.01); *H02K 21/24* (2013.01); *H02K 47/20* (2013.01); *Y02E 60/16* (2013.01)

(58) Field of Classification Search
CPC ........ H02K 16/00; H02K 21/24; H02K 19/38; H02K 16/04; H02K 1/2793
USPC .................................. 310/112–114, 74, 268
See application file for complete search history.

(56) References Cited

U.S. PATENT DOCUMENTS

| | | | | |
|---|---|---|---|---|
| 5,396,140 A | * | 3/1995 | Goldie | H02K 17/16 310/114 |
| 5,907,199 A | * | 5/1999 | Miller | H02K 16/04 310/112 |
| 6,002,193 A | * | 12/1999 | Canini | H02K 3/46 310/101 |
| 6,023,152 A | | 2/2000 | Briest et al. | |
| 6,762,526 B2 | * | 7/2004 | Isozaki | H02K 37/125 310/112 |
| 6,828,710 B1 | | 12/2004 | Gabrys | |
| 7,659,686 B2 | | 2/2010 | Osada et al. | |

(Continued)

FOREIGN PATENT DOCUMENTS

| | | |
|---|---|---|
| CA | 2612040 A1 | 6/2008 |
| EP | 1565337 A1 | 8/2005 |

(Continued)

OTHER PUBLICATIONS

J. Oliveira, et al., "Power Balance Control in an AD/DC/AC Converter for Regenerative Braking in a Two-Voltage-Level Flywheel-Based Driveline," International Journal of Vehicular Technology, ID 934023, 2011, 10 pages.

(Continued)

*Primary Examiner* — Thanh Lam
(74) *Attorney, Agent, or Firm* — Cantor Colburn LLP

(57) ABSTRACT

A motor-generator includes a stator disposed along a centerline including a stator pole, a first stator winding and a second stator winding, wherein the first stator winding is wound on the stator pole and the second stator winding is wound on the stator pole, and at least one rotor axially disposed from the stator along the centerline.

13 Claims, 4 Drawing Sheets

(56) References Cited

U.S. PATENT DOCUMENTS

| | | |
|---|---|---|
| 7,880,424 B2 | 2/2011 | Seguchi |
| 8,030,787 B2 | 10/2011 | Kalev |
| 8,358,111 B2 | 1/2013 | Rozman et al. |
| 8,643,238 B2 | 2/2014 | Ling |
| 8,699,251 B2 | 4/2014 | Rozman et al. |
| 8,912,765 B2 | 12/2014 | Rozman et al. |
| 2008/0073995 A1 | 3/2008 | Niguchi et al. |
| 2010/0244446 A1 | 9/2010 | Qu et al. |
| 2012/0299401 A1 | 11/2012 | Prucher |
| 2013/0033136 A1 | 2/2013 | McMullen |
| 2013/0154449 A1 | 6/2013 | Shen |
| 2014/0191606 A1 | 7/2014 | Gieras et al. |
| 2018/0034353 A1 | 2/2018 | Gieras et al. |

FOREIGN PATENT DOCUMENTS

| | | |
|---|---|---|
| EP | 1931015 | 6/2008 |
| EP | 2133981 A2 | 12/2009 |

OTHER PUBLICATIONS

B.S. Fagne, et al., "Experimental Set Up to Demonstrated Role of Flywheel for Increasing Battery Life of Electric Vehicles," International Journal of Engineering Research & Technology (IJERT), vol. 4 Issue 5, May 2015, 3 pages.

EP SR dated Apr. 7, 2017 in EP Patent Application No. 16202729, 6 pages.

EP Application No. 17182918.7 European Search Report dated Dec. 5, 2017, 8 pages.

\* cited by examiner

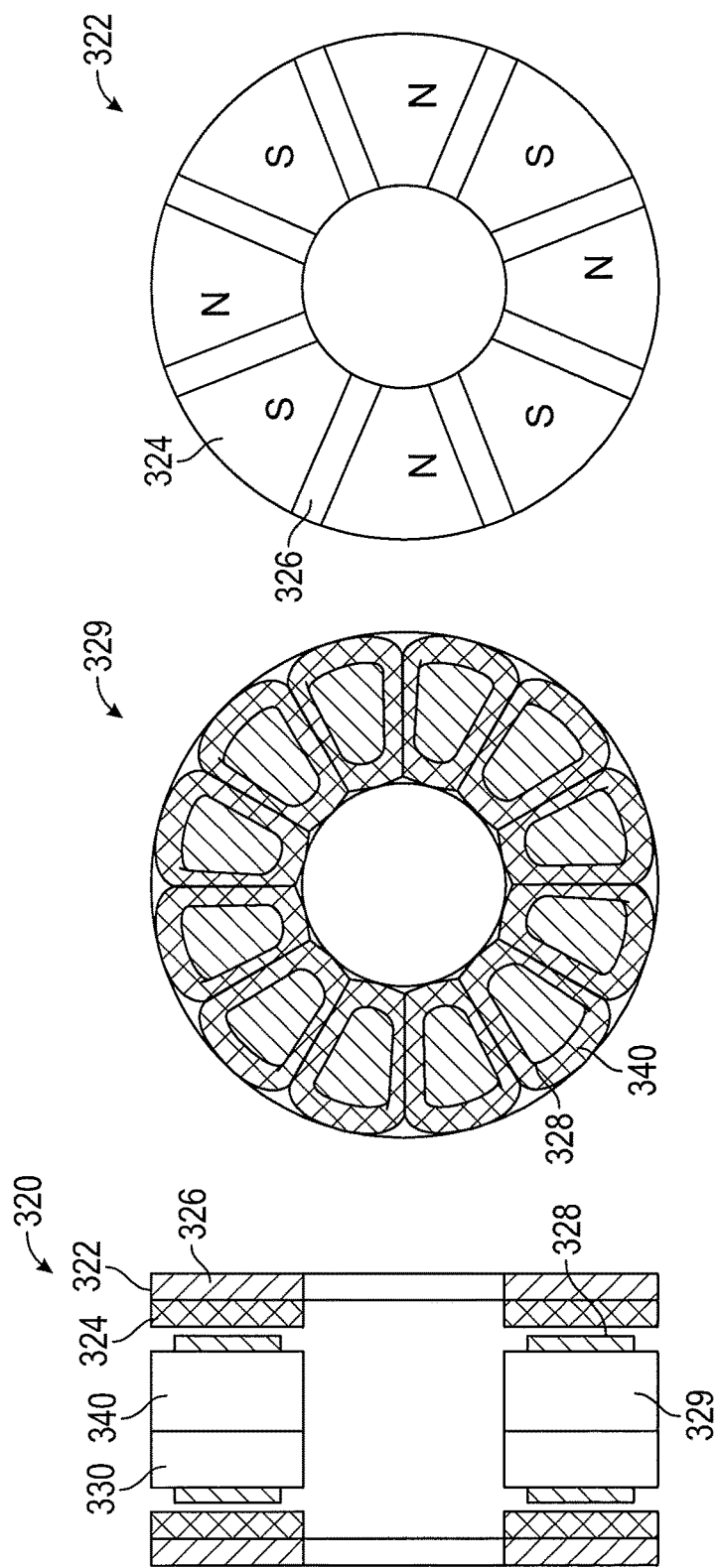

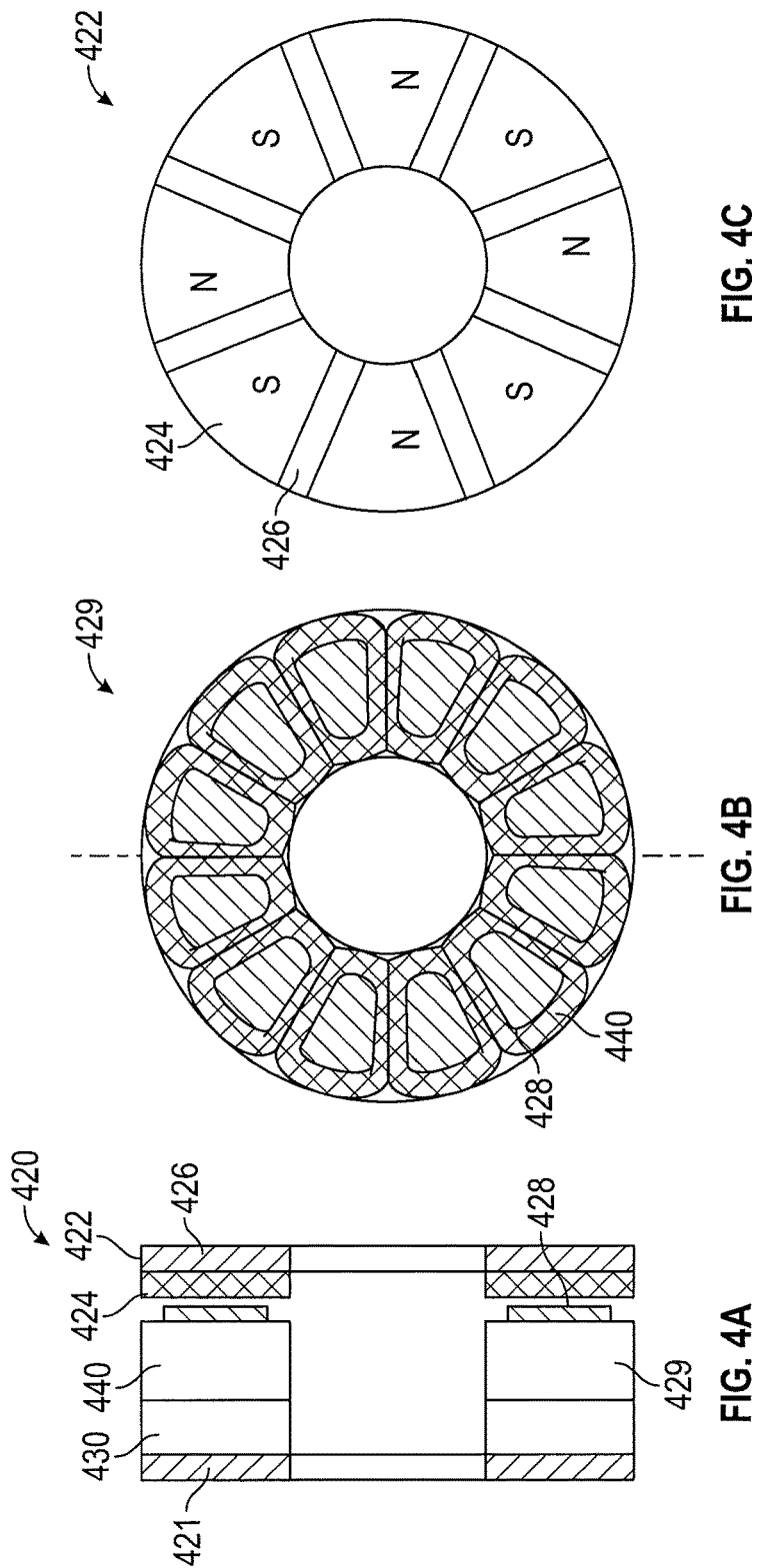

MOTOR-GENERATOR WITH MULTIPLE STATOR WINDINGS

BACKGROUND

The subject matter disclosed herein relates to motor-generators, and more particularly, to a motor-generator with a stator with multiple stator windings.

Flywheel energy storage systems can be used to store energy that may be typically wasted and release energy as needed. Flywheel energy storage systems may utilize supplemental energy storage to increase functionality of the storage system. Often, utilizing multiple sources of energy within a flywheel energy storage system may result in a motor-generator that is large, complex, and cost prohibitive.

BRIEF SUMMARY

According to an embodiment, a motor-generator includes a stator disposed along a centerline including a stator pole, a first stator winding and a second stator winding, wherein the first stator winding is wound on the stator pole and the second stator winding is wound on the stator pole, and at least one rotor axially disposed from the stator along the centerline.

According to an embodiment, an energy storage system includes a flywheel, and a motor-generator including a stator disposed along a centerline including a stator pole, a first stator winding and a second stator winding, wherein the first stator winding is wound on the stator pole and the second stator winding is wound on the stator pole, and at least one rotor operatively coupled to the flywheel, wherein the at least one rotor is axially disposed from the stator along the centerline.

Technical function of the embodiments described above includes that the first stator winding is wound on the stator pole and the second stator winding is wound on the stator pole.

Other aspects, features, and techniques of the embodiments will become more apparent from the following description taken in conjunction with the drawings.

BRIEF DESCRIPTION OF THE DRAWINGS

The subject matter is particularly pointed out and distinctly claimed in the claims at the conclusion of the specification. The foregoing and other features, and advantages of the embodiments are apparent from the following detailed description taken in conjunction with the accompanying drawings in which like elements are numbered alike in the FIGURES:

FIG. 3A is a cross sectional view of one embodiment of a motor-generator for use with the energy storage system of FIG. 1;

FIG. 3B is an elevation view of one embodiment of a stator for use with the motor-generator of FIG. 3A;

FIG. 3C is an elevation view of one embodiment of a rotor for use with the motor-generator of FIG. 3A;

FIG. 4A is a cross sectional view of one embodiment of a motor-generator for use with the energy storage system of FIG. 1;

FIG. 4B is an elevation view of one embodiment of a stator for use with the motor-generator of FIG. 4A; and FIG. 4C is an elevation view of one embodiment of a rotor for use with the motor-generator of FIG. 4A.

DETAILED DESCRIPTION

Figure 1:
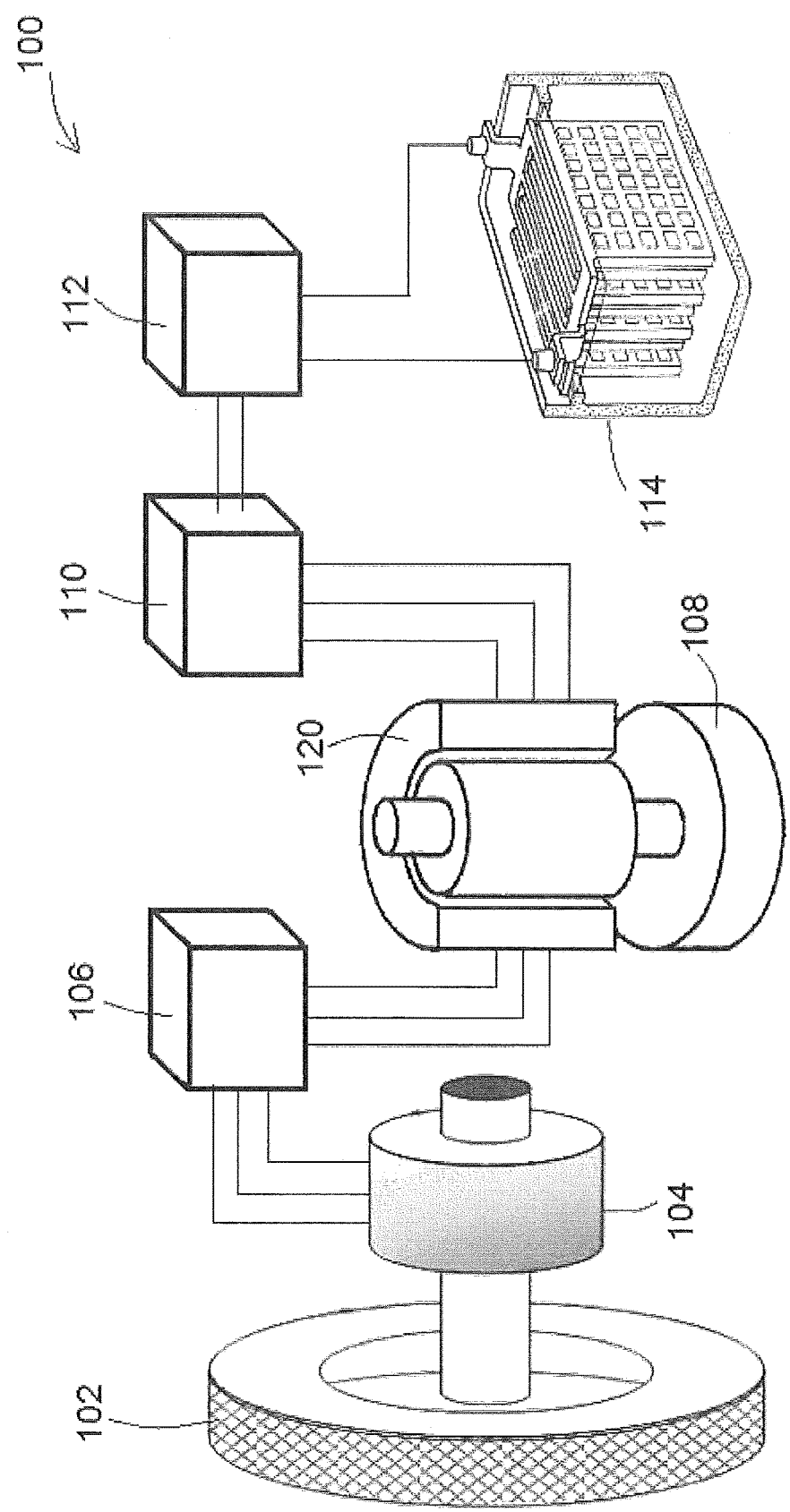
FIG. 1 is a schematic view of one embodiment of an energy storage system.
Figure 2:
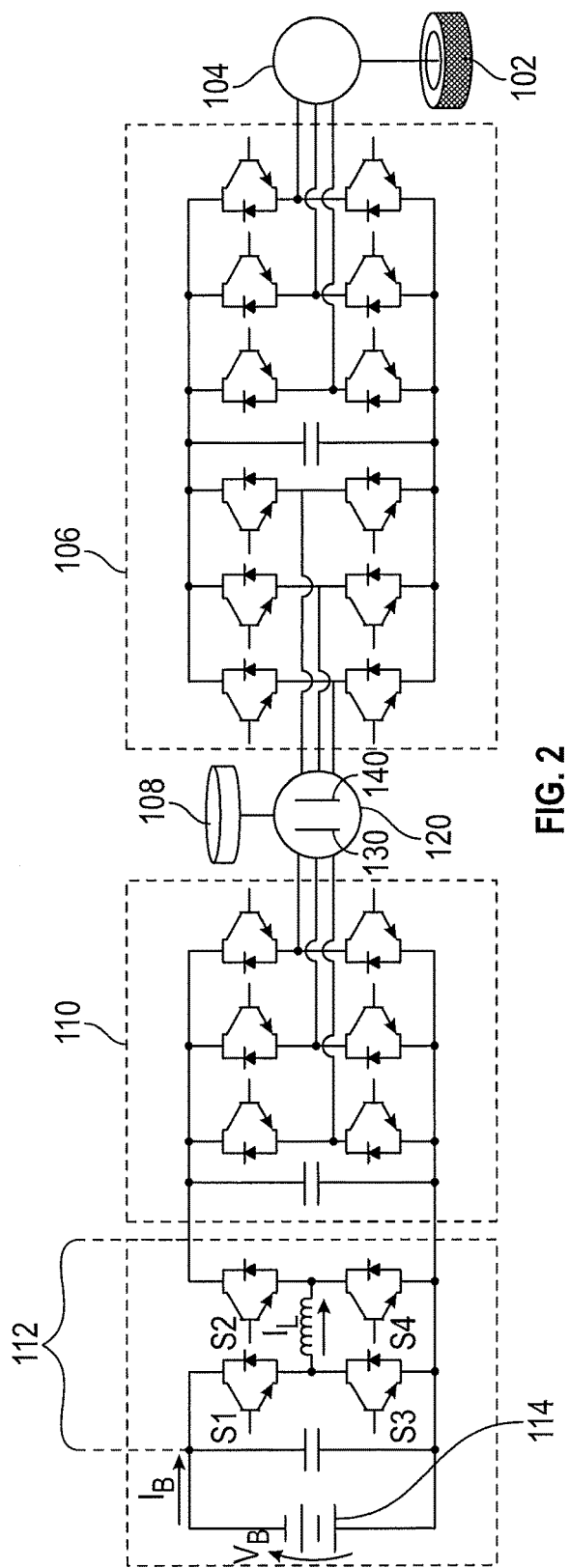
FIG. 2 is an electrical diagram view of the energy storage system of FIG. 1.

Referring now to the drawings, FIGS. 1 and 2 show an energy storage system 100. In the illustrated embodiment, the energy storage system 100 includes a wheel 102, a motor 104, a motor-generator 120, a flywheel 108, and a battery 114. In the illustrated embodiment, the energy storage system 100 can store energy from the wheel 102 and the battery 114, and release energy to the wheel 102 and the battery 114 to serve as an energy buffer to meet peak energy requirements. Advantageously, the energy storage system 100 can be used with vehicles to efficiently store and use energy and increase the battery life of the battery 114.

In the illustrated embodiment, the energy storage system 100 can provide and receive kinetic energy from the wheel 102. In other embodiments, the wheel 102 can be representative of any load that can provide and receive kinetic energy from the energy storage system 100. In the illustrated embodiment, the wheel 102 is driven by a wheel motor 104. Further, the wheel motor 104 can function as a generator to convert kinetic energy from the wheel 102 to electrical energy for use with the energy storage system 100. In certain embodiments, the wheel motor 104 can be a traction motor. In the illustrated embodiment, the wheel motor 104 is a high voltage motor. Further, the wheel motor 104 can be an AC permanent magnet synchronous motor. Advantageously, the wheel motor 104 can be high efficiency and provide high power density.

In the illustrated embodiment, the wheel motor 104 can be electrically connected to the motor-generator 120 via an AC/DC/AC converter 106. In certain embodiments, the AC/DC/AC converter 106 is a three phase, four quadrant converter. In the illustrated embodiment, the AC/DC/AC converter 106 can facilitate bidirectional power transfer to the wheel 102 and from the wheel 102. During a drive mode, power flows to the wheel motor 104 and AC/DC/AC converter 106 operates as a rectifier at the motor-generator 120 side and as an inverter as the wheel motor 104 side as kinetic energy from the flywheel 108 is transferred as kinetic energy of the wheel 102. During braking or other regenerative operations, the AC/DC/AC converter 106 operates as a rectifier at the wheel motor 104 side and as an inverter at the motor-generator 120 side as kinetic energy from the wheel 102 is transferred to the flywheel 108 by facilitating generation operations of the wheel motor 104.

In the illustrated embodiment, the battery 114 can introduce stored chemical energy into the energy storage system 100. The battery 114 can further store and provide energy to the wheel 102. In certain embodiments, the battery 114 may provide energy, but may not provide adequate transient response for immediate power demands as may be required with certain applications, such as vehicles. Therefore, in certain embodiments, the battery 114 can provide energy to the flywheel 108 for use by the energy storage system 100 which may then be rapidly deployed as needed. In the illustrated embodiment, the battery 114 can be representative of any suitable energy source.

In the illustrated embodiment, the battery 114 is electrically connected to the motor-generator 120 via a bidirectional DC/DC converter 112 and a bidirectional AC/DC converter 110. In the illustrated embodiment, the DC/DC converter 112 controls output from the battery 114 to limit output current or alternatively boost battery 114 voltage. Further, the DC/DC converter 112 can be utilized to recharge the battery 114 by using energy from the flywheel 108. In the illustrated embodiment, the AC/DC converter 110 can control the speed and torque of the flywheel 108 while the AC/DC converter functions as an inverter. Further, the AC/DC converter 110 can function as a rectifier as energy stored in the flywheel 108 is sent to the battery 114.

In the illustrated embodiment, the motor-generator 120 is connected to the flywheel 108 either directly, by a gearbox or by a linkage. The flywheel 108 can provide energy storage by storing and releasing kinetic energy to either the wheel motor 104 or the battery 114. The energy storage parameters of the flywheel 108 are determined by the moment of inertia and the rotational speed of the flywheel 108.

The motor-generator 120 can receive electrical energy from the wheel motor 104 and the battery 114 to provide kinetic energy to the flywheel 108. Further the motor-generator 120 can provide electrical energy to the wheel motor 104 and the battery 104 from the kinetic energy of the flywheel 108. As shown in FIG. 2, the motor-generator 120 can include a low voltage coil winding 130 and a high voltage coil winding 140 to allow electrical connections to both the low voltage/low power battery 114 and the high voltage/high power wheel motor 104 simultaneously. Advantageously, the motor-generator 120 can allow for the energy storage system 100 to operate at two voltage levels, similar to a traditional electrical transformer, by allowing energy to be introduced and removed by both the low voltage coil winding 130 and the high voltage coil winding 140. The motor-generator 120 can be used in any suitable application, including, but limited to vehicles such as hybrid or full electric vehicles.

Referring to FIGS. 3A-3C the motor-generator 320 is shown. In the illustrated embodiment, the motor-generator 320 includes a stator 329, a low voltage coil winding 330, a high voltage coil winding 340, and a rotor 322. In the illustrated embodiment, the motor-generator 320 is an axial flux motor wherein magnetic flux travels axially along the centerline between the stator 329 and the rotor 322. In certain embodiments, the motor-generator 320 is a synchronous AC motor-generator.

Referring to FIGS. 3A and 3B, in the illustrated embodiment, the stator 329 includes a low voltage coil winding 330 and a high voltage coil winding 340. In the illustrated embodiment, the low voltage coil winding 330 and the high voltage coil winding 340 are two distinct windings that are both wound on the same stator pole 328. Advantageously, the low voltage coil winding 330 and the high voltage coil winding 340 are configured for use in an axial flux motor-generator 320 to allow the low voltage coil winding 330 to be disposed axially from the high voltage coil winding 340 along the stator pole 328, as best shown in FIG. 3A. In the illustrated embodiment, the low voltage coil winding 330 is wrapped around the stator pole 328. In the illustrated embodiment, the low voltage coil winding 330 is a concentrated-parameter coil to allow for enough space for both independent windings 330,340. In certain embodiments, the low voltage coil winding 330 can include 12 coils, which can facilitate the use of three-phase power. In other embodiments, the low voltage coil winding 330 can include any number of coils in multiples of three or any other suitable number of coils which can facilitate the use of three-phase power. In certain embodiments, the low voltage coil winding 330 may experience voltage ranging from 20 to 40 VDC after rectification. In certain embodiments, the low voltage coil winding 330 may experience any suitable DC voltage after rectification. In the illustrated embodiment, the low voltage coil winding 330 is formed from a material and geometry to be suitable for use with the expected voltage and power.

In the illustrated embodiment, the high voltage coil winding 340 is wrapped around the same stator pole 328 as the low voltage coil winding 330. In the illustrated embodiment, the high voltage coil winding 340 is a concentrated-parameter coil to allow for enough space for both independent windings 330,340. In certain embodiments, the high voltage coil winding 340 can include 12 coils, which can facilitate the use of three-phase power. In other embodiments, the high voltage coil winding 340 can include any number of coils in multiples of three or any other suitable number of coils which can facilitate the use of three-phase power. In certain embodiments, the high voltage coil winding 340 may experience voltage ranging from 270 to 800 VDC after rectification. In certain embodiments, the high voltage coil winding 340 may experience any suitable DC voltage after rectification. In the illustrated embodiment, the high voltage coil winding 340 is formed from a material and geometry to be suitable for use with the expected voltage and power.

In the illustrated embodiment, the energy storage system 100 can have independent control over each coil winding 330,340. In certain embodiments, the coil windings 330,340 can be utilized to provide redundant control and operation of the motor-generator 320. In certain embodiments, the magnetic coupling between the low voltage coil winding 330 and the high voltage coil winding 340 functions as a transformer by facilitating the step up or step down of voltage via the magnetic coupling there between.

Referring to FIGS. 3A and 3C the rotors 322 of the motor-generator 320 are shown. In the illustrated embodiment, the rotors 322 are twin disk shaped rotors axially aligned along the centerline of the stator 329. During operation, axial flux between the stator 329 and the rotor 322 facilitates operation of the motor-generator 320. In the illustrated embodiment, one rotor 322 is disposed axially adjacent the low voltage coil winding 330 portion of the stator 329 and another rotor 322 is disposed opposite the first rotor and is disposed axially adjacent the high voltage coil winding 340 portion of the stator 329.

In the illustrated embodiment, the rotors 322 include a rotor backing plate 326 and a permanent magnet 324. In the illustrated embodiment, the rotors 322 are coupled to the flywheel 108 to send and receive kinetic energy therefrom. In certain embodiments, the mass of the rotor 322 can be utilized or supplement the energy storage function of the flywheel 108. In certain embodiments, the rotor 322 can be integrated with the flywheel 108. In other embodiments, the mass of the rotor 322 can be utilized as the flywheel 108.

In the illustrated embodiment, the rotors 322 include permanent magnets 324. In other embodiments, the rotors 322 can be wound field rotors utilized with brushless exciters.

Referring to FIGS. 4A-4C another embodiment of the motor-generator 420 is shown wherein the second and third digits of the reference numerals of FIGS. 4A-4C correspond to the second and third digits of the reference numerals of FIGS. 3A-3C. In the illustrated embodiment, the motor-generator 420 includes a single rotor 422 and a ferromagnetic ring 421. In the illustrated embodiment, the motor-generator 420 includes a single rotor 422 axially aligned with the centerline of the stator 429. In the illustrated embodiment, the single rotor 422 is axially adjacent to the high voltage coil winding 440. In other embodiments, the single rotor 422 is disposed at any suitable location. In the illustrated embodiment, the ferromagnetic ring 421 is affixed to the stator 429 to create a return path for the flux of the low voltage coil winding 330 and the high voltage coil winding 440. In the illustrated embodiment, the ferromagnetic ring 421 allows for a single rotor 422 to be utilized with multiple coil windings 430,440.

The terminology used herein is for the purpose of describing particular embodiments only and is not intended to be limiting of the embodiments. While the description of the present embodiments has been presented for purposes of illustration and description, it is not intended to be exhaustive or limited to the embodiments in the form disclosed. Many modifications, variations, alterations, substitutions or equivalent arrangement not hereto described will be apparent to those of ordinary skill in the art without departing from the scope and spirit of the embodiments. Additionally, while various embodiments have been described, it is to be understood that aspects may include only some of the described embodiments. Accordingly, the embodiments are not to be seen as limited by the foregoing description, but are only limited by the scope of the appended claims.

What is claimed is:

1. A motor-generator, comprising:
   a stator disposed along a centerline including a stator pole, a first stator winding and a second stator winding, wherein the first stator winding is wound on the stator pole and the second stator winding is wound on the stator pole; and
   at least one rotor axially disposed from the stator along the centerline,
   wherein the first stator winding is axially adjacent to the second stator winding along the stator pole.

2. The motor-generator of claim 1, wherein the first stator winding is a first concentrated parameter stator winding and the second stator winding is a second concentrated parameter stator winding .

3. The motor-generator of claim 1, wherein the motor-generator is an axial flux motor-generator.

4. The motor-generator of claim 1, wherein the motor-generator is a synchronous AC motor-generator.

5. The motor-generator of claim 1, wherein the first stator winding is a high voltage stator winding.

6. The motor-generator of claim 5, wherein the second stator winding is a low voltage stator winding.

7. The motor-generator of claim 1, wherein the first stator winding has a first operating voltage and the second stator winding has a second operating voltage.

8. The motor-generator of claim 1, wherein the first stator winding and the second stator winding are in magnetic communication.

9. The motor-generator of claim 1, wherein the at least one rotor includes a first rotor axially disposed from the stator along the centerline and a second rotor axially disposed from the stator along the centerline opposite the first rotor.

10. The motor-generator of claim 1, further comprising a ferromagnetic ring coupled to the stator, wherein the ferromagnetic ring is disposed opposite the at least one rotor.

11. A motor-generator, comprising:
    a stator pole;
    first and second stator windings, which are axially adjacent along and respectively wound on the stator pole;
    a first rotor disposed at a distance from the stator to be proximate to an exterior surface of the first stator winding; and
    a second rotor disposed at a distance from the stator to be proximate to an exterior surface of the second stator winding,
    wherein:
    the first rotor comprises a first rotor backing plate and a first permanent magnet, which is supported on the first rotor backing plate and which is axially interposed between the first rotor backing plate and the first stator winding, and
    the second rotor comprises a second rotor backing plate and a second permanent magnet, which is supported on the second rotor backing plate and which is axially interposed between the second rotor backing plate and the second stator winding.

12. The motor-generator according to claim 11, wherein the stator pole, the first and second stator windings and the first and second rotors are disposed along a centerline.

13. The motor-generator according to claim 11, wherein the first stator winding is a high voltage stator winding and the second stator winding is a low voltage stator winding.

* * * * *